(12) United States Patent
Miller (10) Patent No.: US 8,441,775 B2
(45) Date of Patent: May 14, 2013

(54) CONFORMAL DEPOSITION OF DIELECTRIC COMPOSITES BY ELETROPHORESIS

(75) Inventor: Seth Adrian Miller, Englewood, CO (US)

(73) Assignee: Empire Technology Development, LLC, Wilmington, DE (US)

( * ) Notice: Subject to any disclaimer, the term of this patent is extended or adjusted under 35 U.S.C. 154(b) by 460 days.

(21) Appl. No.: 12/638,224

(22) Filed: Dec. 15, 2009

(65) Prior Publication Data

US 2011/0140525 A1 Jun. 16, 2011

(51) Int. Cl.
*H01G 9/00* (2006.01)
*H01G 4/06* (2006.01)

(52) U.S. Cl.
USPC ............ 361/523; 361/524; 336/200; 336/223

(58) Field of Classification Search ............ 361/66, 361/524, 523; 336/200, 223
See application file for complete search history.

(56) References Cited

U.S. PATENT DOCUMENTS

| | | | | |
|---|---|---|---|---|
| 3,027,279 A | * | 3/1962 | Kurka et al. | 442/117 |
| 5,065,284 A | * | 11/1991 | Hernandez | 361/794 |
| 6,159,417 A | | 12/2000 | Giordano | |
| 6,538,907 B2 | | 3/2003 | Hoshino et al. | |
| 6,764,931 B2 | * | 7/2004 | Iijima et al. | 438/584 |
| 6,788,182 B2 | * | 9/2004 | Young et al. | 336/200 |
| 6,875,655 B2 | * | 4/2005 | Lin et al. | 438/253 |
| 7,033,406 B2 | | 4/2006 | Weir et al. | |
| 7,164,197 B2 | | 1/2007 | Mao et al. | |
| 7,466,536 B1 | | 12/2008 | Weir et al. | |
| 7,572,878 B2 | * | 8/2009 | Ding et al. | 528/340 |
| 7,589,956 B2 | * | 9/2009 | Norton et al. | 361/518 |
| 2004/0114310 A1 | * | 6/2004 | Katsir et al. | 361/523 |
| 2008/0123251 A1 | * | 5/2008 | Randall et al. | 361/524 |
| 2011/0013342 A1 | * | 1/2011 | Idemoto et al. | 361/322 |
| 2011/0013427 A1 | * | 1/2011 | Weir et al. | 363/37 |

OTHER PUBLICATIONS

International Search Report and Written Opinion for Application PCT/2010/060298, mailed Mar. 7, 2011.
Besra, L. et al., "A Review on Fundamentals and Applications of Electrophoretic Deposition (EPD)," Progress in Materials Science 52, 2007, pp. 1-61.
Teranishi, T. et al., "Size Control of Monodispersed Pt Nanoparticles and Their 2D Organization by Electrophoretic Deposition," J. Phys. Chem. B., 1999, pp. 3818-3827.
"Electrophoretic Deposition," accessed at http://www.nd.edu/~pkamat/synthesis/electrophoretic.html, accessed on Mar. 7, 2012, 1 page.
International Preliminary Report on Patentability for application with application No. PCT/US2010/060298, dated Jun. 28, 2012, 10 pages.

* cited by examiner

*Primary Examiner* — Rexford Barnie
*Assistant Examiner* — Zeev V Kitov
(74) *Attorney, Agent, or Firm* — Steven S. Rubin, Esq.; Moritt Hock & Hamroff LLP (57) ABSTRACT

Techniques are generally described herein for the design, manufacture and use of composite dielectric materials. Embodiments include, but are not limited to, methods, apparatuses, and systems. Other embodiments may also be disclosed and claimed. Some techniques described herein include electrophoretic deposition of dielectric particles to conformally form a thin layer of dielectric material for use in energy storage devices. Example energy storage devices include capacitor devices, which in some instances may be used to replace and/or assist in the operation of batteries, ultra-capacitors, and other similar devices.

20 Claims, 8 Drawing Sheets

000
CONFORMAL DEPOSITION OF DIELECTRIC COMPOSITES BY ELETROPHORESIS

BACKGROUND

Unless otherwise indicated herein, the materials described in this section are not prior art to the claims in this application and are not admitted to be prior art by inclusion in this section.

Capacitors may be used for various energy storage applications. A dielectric material is typically sandwiched between two conductive layers to form the capacitor. The dielectric material currently may be manufactured using methods such as lamination or solvent casting (e.g., spray coating) of a dielectric layer, followed by melting a layer of polymer on top of the dielectric to fill any spaces in the dielectric layer. For non-planar underlying conductive layers, these manufacturing methods typically lead to planar yet non-uniformly-thick layers of dielectric composite.

BRIEF DESCRIPTION OF THE DRAWINGS

Subject matter is particularly pointed out and distinctly claimed in the concluding portion of the specification. The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

all arranged in accordance with various embodiments of the present disclosure.

DETAILED DESCRIPTION OF EMBODIMENTS

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatuses, and systems related to dielectric composites formed by electrophoretic deposition. Techniques are generally described herein for the design, manufacture and use of composite dielectric materials. Embodiments include, but are not limited to, methods, apparatuses, and systems. Other embodiments may also be disclosed and claimed. Some techniques described herein include electrophoretic deposition of dielectric particles to form a thin layer of dielectric material for use in energy storage devices. Example energy storage devices include capacitor devices, which in some instances may be used to replace and/or assist in the operation of batteries, ultra-capacitors, and other similar devices. As used herein, a "dielectric composite" may comprise a dielectric layer having spaces filled with a polymer.

Various embodiments may include a dielectric composite apparatus comprising a first conductive layer and a dielectric composite on the first conductive layer. The dielectric composite may comprise a layer of dielectric material (a dielectric layer) conformally formed on the first conductive layer, and a polymer disposed within spaces of the dielectric layer. A second conductive layer may be formed on the dielectric composite.

The present disclosure recognizes that for non-planar (e.g., rough, wavy, or uneven) underlying conductive layers, methods enlisting lamination or solvent coating of dielectric layers tend to result in planar yet non-uniformly-thick dielectric layers or composites (i.e., dielectric layer with polymer-filled spaces). Since the planar top surface of the dielectric layer or composite is less than the surface area of the non-planar underlying conductive layer, a top conductive layer deposited on top of the dielectric layer or composite would have a surface area substantially equal to the planar top surface of the dielectric layer or composite and less than the surface area of the non-planar underlying conductive layer. As the energy storage capability of capacitors may be directly related to the surface area of the conductive layers (the capacitor electrodes), any benefit that could be gained from a conductive layer having a non-planar surface may be lost.

In contrast, the described dielectric layers may be formed by electrophoretic deposition, which may provide a substantially uniformly-thick layer of dielectric even on non-planar underlying conductive layer surfaces. In other words, the described surface area of the dielectric layer may correspond to the surface area of the underlying conductive layer. As a result, the surface area of a top capacitor electrode may be correspondingly increased relative to top capacitor electrodes formed over laminated or solvent coated dielectric layers.

Figure 1:
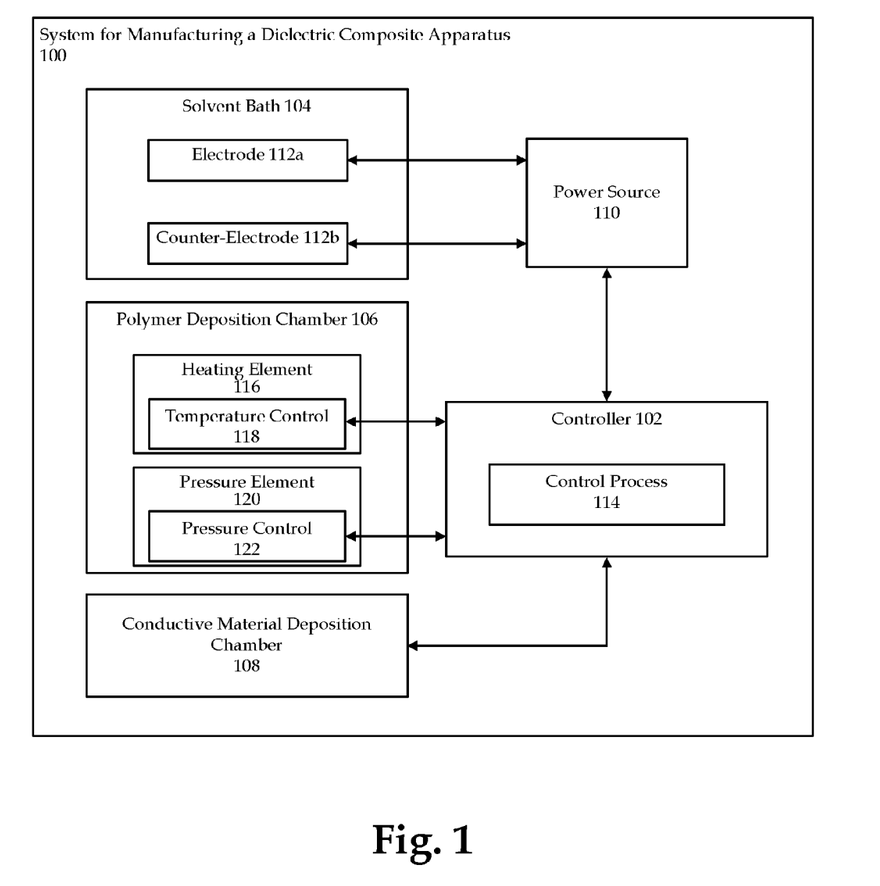
FIG. 1 is a block diagram of an example system for manufacturing an apparatus including a dielectric composite.

FIG. 1 is a block diagram of an example system for manufacturing an apparatus including a dielectric composite, arranged in accordance with at least some embodiments of the present disclosure. A basic configuration of the system 100 may include a controller 102, a solvent bath 104, a polymer deposition chamber 106, a conductive material deposition chamber 108, and a power source 110, all coupled together and generally configured as illustrated.

The controller 102 may be any device suitable for monitoring, adjusting, and/or controlling a process of manufacturing a dielectric composite according to the various methods described herein. For example, the controller 102 may be a computing device (e.g., a computer system, a microprocessor, a microcontroller, etc.) or an embedded controller (e.g., an Application Specific Integrated Circuit (ASIC), or some other equivalent). The controller 102 may include a control process 114 that includes one or more instructions for monitoring, adjusting, and/or the controlling the process of manufacturing a dielectric composite according to the various methods described herein. For the example, the control process 114 may include instructions for implementing a method for making a dielectric composite apparatus, comprising conformally depositing by electrophoresis a layer of dielectric material on a first conductive layer, filling spaces in the layer of dielectric material with a polymer, and forming a second conductive layer on the layer of dielectric material filled with the polymer to form the dielectric composite apparatus. Various instructions processed by controller 102 may include adapting the power source 110 to control the signals (e.g., voltage, current, etc.) delivered to various electrodes in solvent bath 104, adapting the temperature utilized by heating/cooling, or pressure control devices in polymer deposition chamber 106, and/or any other controls associated with conductive material deposition chamber 108.

The conductive material deposition chamber 108 may be configured to form a first conductive layer on a conductive, semi-conductive, or non-conductive substrate by any suitable deposition method. For example, the conductive material deposition chamber 108 may be configured (e.g., via one or more control signals from controller 102 to conductive material deposition chamber 108) to form the first conductive layer by physical vapor deposition (e.g., sputtering), chemical vapor deposition (CVD), electroplating, lamination, silk screening, or the like. The conductive deposition chamber 108 may be configured to form conductive layers comprising any material suitable for forming a dielectric composite apparatus, in accordance with at least some embodiments of the present disclosure. Example suitable materials for forming the first conductive layer may include aluminum (Al), copper (Cu), platinum (Pt), gold (Au), silver (Ag), or nickel (Ni), or combinations thereof. Other suitable materials for forming conductive layers may include semi-conductive materials such as, for example, silicon (Si), gallium nitride (GaN), or gallium arsenide (GaAs). Other conductive or semi-conductive materials may be similarly suitable for forming the first conductive layer.

The solvent bath 104 may be configured (e.g., via one or more signals from power source 110 to solvent bath 104) to facilitate conformal deposition of a layer of dielectric material onto the first conductive layer by electrophoretic deposition. The dielectric material may comprise particles of any material suitable for forming a dielectric composite. In various embodiments, high-k (high dielectric constant) materials may be suitable, depending on the particular applications. "High-k" may comprise dielectric materials having a dielectric constant greater than about 3.9, the dielectric constant of silicon dioxide ($SiO_2$), or in some embodiments, up to about 6000. Example suitable dielectric materials may include barium titanate ($BaTiO_3$), hafnium silicate ($HfSiO_4$), zirconium silicate ($ZrSiO_4$), hafnium oxide ($HfO_2$), or zirconium dioxide ($ZrO_2$). In various embodiments, the dielectric material 104 may comprise barium titanate coated with aluminum oxide ($Al_2O_3$). Other dielectric materials, or combinations of dielectric materials, may be similarly suitable.

To that end, the solvent bath 104 may contain a solvent, the dielectric material, an electrode 112a, and a counter-electrode 112b. The solvent may comprise any solvent suitable for electrophoretic deposition and suitable for establishing a composition and rheology capable of maintaining particle dispersion, including, for example, a solvent having a dielectric constant between about 12 and about 35. An organic solvent such as acetone ($OC(CH_3)_2$), ethanol ($C_2H_5OH$), isopropanol ($C_3H_7OH$), or methyl ethyl ketone ($CH_3C(O)CH_2CH_3$), for example, may be suitable in various embodiments. Mixed solvent systems such as acetone and ethanol, or ethanol and isopropanol, for example, may also be suitable.

The electrodes 112a, 112b may both be coupled to the power source 110. The electrode 112a may be configured to contact the first conductive layer, and the electrode 112a and the counter-electrode 112b may be configured to bias the conductive layer, by application of a signal (e.g., voltage, current, etc.) from the power source 110 to one or both of the electrodes 112a, 112b, such that particles of the dielectric material are attracted to the first conductive layer.

Biasing of the first conductive layer by the power source 110 may be controlled (e.g., via one or more control signals from controller 102 to power source 110) such that the signals delivered to the electrodes may be varied over time or constant over time, or both, as desired. In one example, a forward bias signal(s) may be applied to the electrode 112a and the counter-electrode 112b continuously for a predetermined time interval, with a specified signal amplitude (e.g., current level, voltage level, etc.). In another example, biasing may be comprised of pulsed biasing where the bias signal(s) applied to the electrode 112a and the counter-electrode 112b may be applied at a regular interval at a given duty cycle, period, amplitude, and pulse width. In some examples, the bias signal may be applied as a sequence of forward bias signals staggered in time (e.g., time multiplexed or interleaved in time) with the application of reverse bias signals. In still other examples, the bias signal(s) may be applied as a signal waveform with a varying amplitude such as a ramp, a saw-tooth, a sine wave, piecewise linear, logarithmic, exponential or some other variety of signal waveform. Additional periodic and non-periodic signal waveforms are also contemplated for either forward biasing or reverse biasing.

The dielectric layer deposited by the solvent bath 104 may sometimes include one or more spaces (or pores) therein, and the spaces may be filled by a polymer deposited by the polymer deposition chamber 106. It may be desirable to fill the spaces as spaces may potentially result in arcing on application of an electric field to the dielectric layer, which may result in failure of various devices incorporating the dielectric layer.

To fill the spaces, a polymer deposition chamber 106 may be utilized. The polymer deposition chamber 106 may be configured (e.g., via one or more control signals from controller 102 to polymer deposition chamber 106) to deposit a polymer on the dielectric layer. The polymer may be deposited as a solid (e.g., powder, particles, sheet, etc.), liquid, gas, or plasma, and the polymer deposition chamber 106 may be configured to deposit the polymer by any suitable method such as, for example, spray deposition, spin coating, chemical vapor deposition, physical vapor deposition, or any other suitable method.

In various embodiments, the particles of dielectric material deposited onto the first conductive layer may include a coating of polymer. The polymer may be pre-coated onto the dielectric material particles according to conventional methods including, for example, polymerization of the dielectric material surface or adsorption of the polymer onto the dielectric material surface. Block copolymers comprising polymer blocks with different solubility properties such that certain blocks are more attracted to the dielectric material than the solvent while other blocks are more attracted to the solvent than the dielectric material, the respective blocks covalently bonding to each other to form the blocked copolymer.

After deposition of the polymer onto the dielectric layer or deposition of the polymer-coated dielectric particles, heat and/or pressure may be applied to the polymer and dielectric to draw the polymer into the spaces in the dielectric layer to form the dielectric composite. To that end, the polymer deposition module 106 may include a heating element 116 and/or a pressure element 120, for application of heat and/or pressure, respectively. The control of various parameters (e.g., heating temperature setting(s), temperature cycle time(s), pressure setting(s), pressure cycle time(s) associated with associated with heating element 116 and/or pressure element 120 may be adaptively controlled by controller 102.

The application of heat by the heating element 116 may cause the polymer to flow, resulting in the polymer flowing into the spaces of the dielectric layer by capillary action. Accordingly, the heating element 116 may be configured (e.g., in response to one or more control signals from controller 102 to heating element 116) to apply heat sufficient to cause the polymer to flow, but lower than a decomposition temperature of the dielectric layer. For embodiments using poly(ethylene terephthalate) (($C_{10}H_8O_4)_n$) as the polymer, for example, the heating element 116 may be configured to apply heat in excess of about 260° C., the melting point of poly(ethylene terephthalate). The decomposition of barium titanate ($BaTiO_3$), an example dielectric material, may tend to occur at substantially 550° C., and so in some embodiments, the heating element 116 may be configured to apply heat above about 260° C. and roughly less than about 550° C.

The pressure element 120 may be configured (e.g., in response to one or more control signals from controller 102 to pressure element 120) to subject the dielectric layer and the polymer thereon to pressure, with or without simultaneous heating by the heating element 116. The application of pressure, either with or without simultaneous heating, may result in or hasten the polymer flowing into the spaces of the dielectric layer. Accordingly, the pressure element 120 may be configured to apply pressure sufficient to cause or assist the flow of polymer into the spaces of the dielectric layer. For example, the pressure element 120 may be configured to apply pressure while the heating element 116 melts the polymer so that the polymer may be drawn into the spaces of the dielectric layer. In various embodiments, the pressure element 120 may be configured to apply a higher pressure of up to about 1,000 psi, or up to about 50,000 psi or more, to isostatically press the polymer into the spaces of the dielectric layer.

The heating element 116 may include a temperature control 118, and the pressure element 120 may include a pressure control 122, both coupled to the controller 102 as illustrated so the controller 102 can monitor, adjust, and/or control the application of heat and pressure.

In various embodiments, the conductive material deposition chamber 108 may be further configured (e.g., via one or more control signals from controller 102 to conductive material deposition chamber 108) to form a second conductive layer on the dielectric composite. Like the first conductive layer, the second conductive layer may comprise any material suitable for forming a dielectric composite or apparatus including a dielectric composite. Example suitable materials for forming the second conductive layer may include aluminum (Al), copper (Cu), platinum (Pt), gold (Au), silver (Ag), or nickel (Ni), or combinations thereof. Other suitable materials for forming conductive layers may include semi-conductive materials such as, for example, silicon (Si), gallium nitride (GaN), or gallium arsenide (GaAs). Other conductive or semi-conductive materials may be similarly suitable for forming the second conductive layer.

Figure 2:
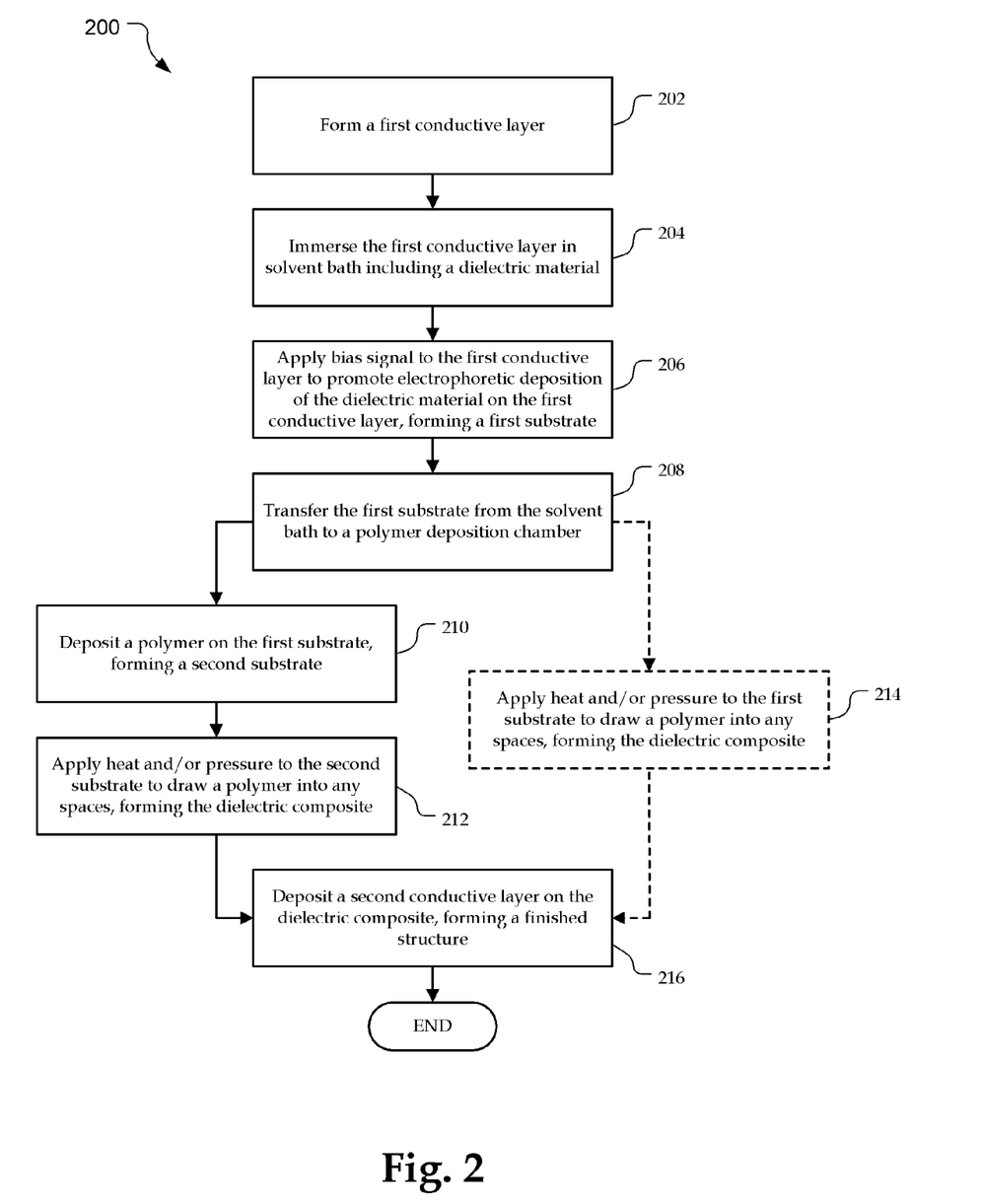
FIG. 2 is a flow diagram illustrating some of the operations associated with an example method of making a dielectric composite apparatus.

The system 100 of FIG. 1 may be more clearly understood with reference to FIG. 2. FIG. 2 is a flow diagram illustrating some of the operations associated with an example method of making a dielectric composite apparatus, arranged in accordance with at least some embodiments of the present disclosure. It should be noted that although the method is illustrated as a series of sequential steps, the method is not necessarily order dependent. Moreover, methods within the scope of this disclosure may include more or fewer steps than that illustrated.

Turning now to FIG. 2, with continued reference to the system 100 illustrated in FIG. 1, the method 200 may include one or more functions, operations, or actions as is illustrated by block 202, block 204, block 206, block 208, block 210, block 212, block 214, and/or block 216. Processing for method 200 may start with block 202, "Form a first conductive layer," which may be performed by the conductive material deposition chamber 108 of the system 100.

From block 202, method 200 may proceed to block 204, "Immerse the first conductive layer in solvent bath including a dielectric material." At block 204, the conductive layer may be immersed into a solvent bath, such as the solvent bath 104 of the system 100. In various embodiments, the dielectric material may comprise polymer-coated dielectric material, as described elsewhere herein.

From block 204, method 200 may proceed to block 206, "Apply bias signal to the first conductive layer to promote electrophoretic deposition of the dielectric material on the first conductive layer, forming a first substrate," the first substrate comprising the conductive layer and the dielectric layer on the conductive layer. At block 206, method 100 may be adapted to apply the bias signal to the first conductive layer using, for example, the electrode 112a (electrically coupled to the first conductive layer), the counter-electrode 112b, and the power source 110 of the system 100.

From block 206, method 200 may proceed to block 208, "Transfer the first substrate from the solvent bath to a polymer deposition chamber," such as the polymer deposition chamber 108 of the system 100.

From block 208, method 200 may proceed to block 210, "Deposit a polymer on the first substrate, forming a second substrate," the second substrate comprising the conductive layer, the dielectric layer on the conductive layer, and the polymer on the dielectric layer. The polymer may be deposited on the first substrate using the polymer deposition chamber 108.

From block 210, method 200 may proceed to block 212, "Apply heat and/or pressure to the second substrate to draw a polymer into any spaces, forming the dielectric composite," the dielectric composite comprising the dielectric layer and the polymer in the spaces of the dielectric layer. Heat and/or pressure may be applied after or during the polymer deposition by the heating element 116 and/or pressure element 120, respectively, of system 100.

In some embodiments, instead of proceeding from block 208 to block 210, the method 200 may proceed from block 208 to block 214, "Apply heat and/or pressure to the first substrate to draw a polymer into any spaces, forming the dielectric composite." As described elsewhere herein, the particles of dielectric material deposited onto the conductive layer may include a coating of polymer. Heat and/or pressure may cause the polymer to be drawn into the spaces in the dielectric layer to form the dielectric composite.

From block 212 or block 214, the method 200 may proceed to block 216, "Deposit a second conductive layer on the dielectric composite, forming a finished structure." The second conductive layer may be deposited by the conductive material deposition chamber 108 of the system 100.

FIGS. 3-7 illustrate cross-sectional views of various stages of a device manufactured with an example method for making a dielectric composite apparatus, arranged according to at least some embodiments described herein. As described herein, the dielectric composite may be conformally deposited onto a conductive layer by an electrophoretic deposition method.

Figure 3:
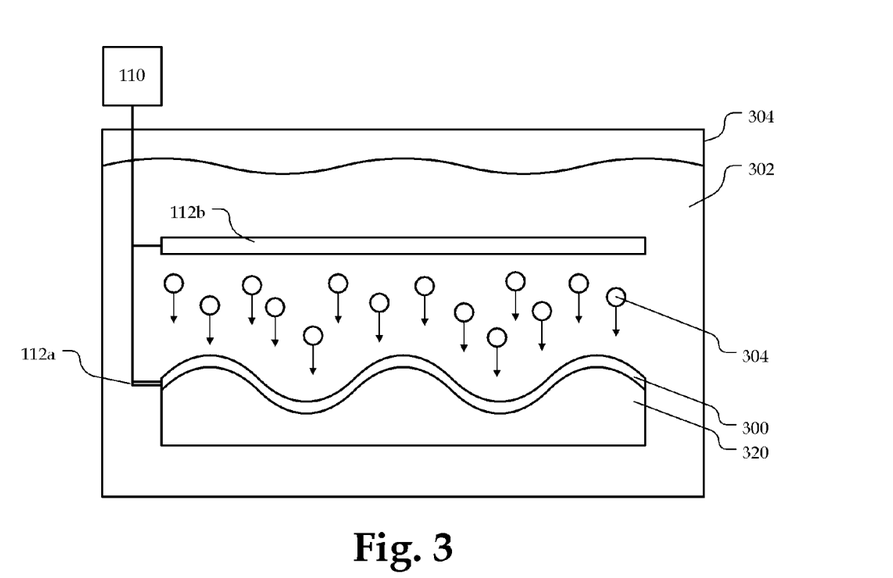
FIGS. 3-7 illustrate cross-sectional views of various stages of a device manufactured with an example method for making a dielectric composite apparatus.

As illustrated in FIG. 3, a first conductive layer 300, which may be on a substrate 320, may be provided. The substrate 320 may comprise any suitable conductive, semi-conductive, or non-conductive material. Example suitable materials for the substrate 320 may include silicon (Si), silicon carbide (SiC), gallium nitride (GaN), gallium arsenide (GaAs), glass, or sapphire. Other conductive, semi-conductive, or non-conductive materials may be similarly suitable for the substrate 320.

Figure 4:
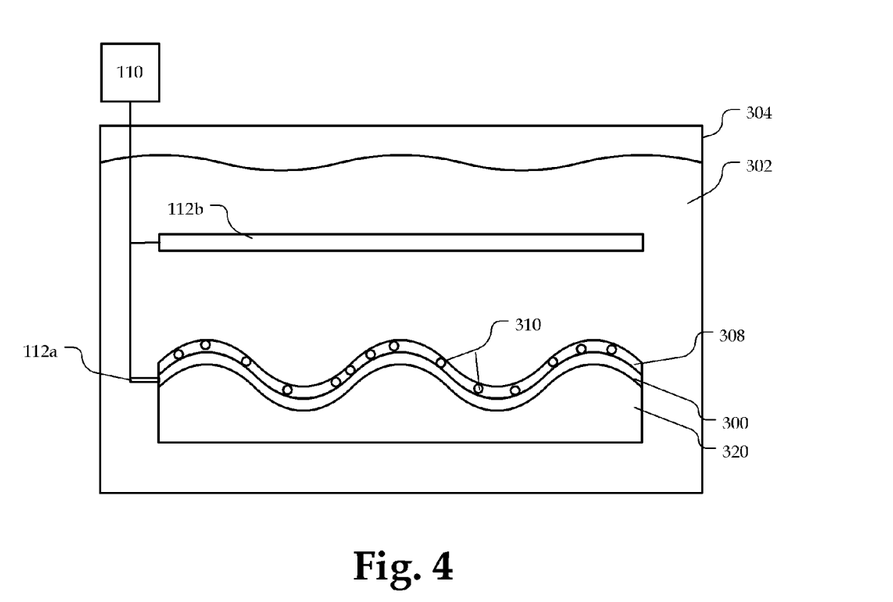

The first conductive layer 300 may be immersed into a bath 304 of a solvent 302 having a dielectric material 304 dispersed in the solvent 302, the solvent bath 304 being configured to facilitate conformal deposition of a layer of dielectric material onto the first conductive layer by electrophoretic deposition. A signal (e.g. voltage, current, electric field, magnetic field, etc.) can be applied by the power source 110 to electrode 112a, which is coupled to the first conductive layer 300, and also to counter-electrode 112b, which may cause the particles of dielectric material 304 to be attracted to the conductive layer 300. Subsequent particles of the dielectric material 304 may adhere to the dielectric material 304 already adhered to the first conductive layer 300 as the repulsive forces between the particles of dielectric material 304 may be overcome by the strength of the electric field. As a result, the particles of dielectric material 304 may conformally form a layer 308 of the dielectric material 304, as illustrated in FIG. 4. Accordingly, although in various embodiments the first conductive layer 300 may have a non-planar surface, the layer 308 of the dielectric material 304 follows the contour of the first conductive layer 300.

Also illustrated in FIG. 4, layer 308 may include one or more spaces 310 (or pores) therein. As described elsewhere herein, spaces 310 could potentially result in arcing on application of an electric field. It may be desirable, therefore, to fill the spaces 310 with a polymer.

Figure 5:
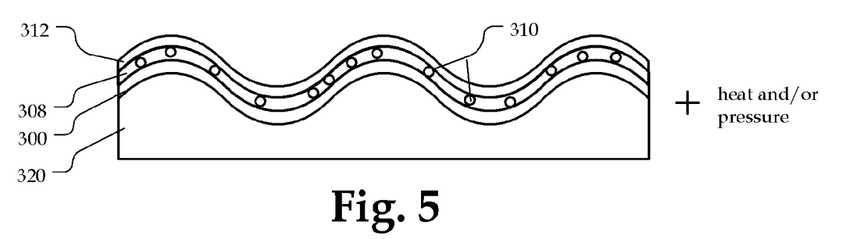

As illustrated in FIG. 5, the first conductive layer 300 having the layer 308 of dielectric material deposited thereon may be removed from the bath 304, and a polymer 312 may be deposited on the layer 308 of dielectric material having the spaces 310 therein using, for example, the polymer deposition chamber 106 of the system 100 of FIG. 1. Heat or pressure, or both, may be applied to the first conductive layer 300 and the polymer 312 to draw the polymer 312 into the spaces 310 in the layer 308 resulting in the structure including the dielectric composite 314 illustrated in FIG. 6.

Figure 7:
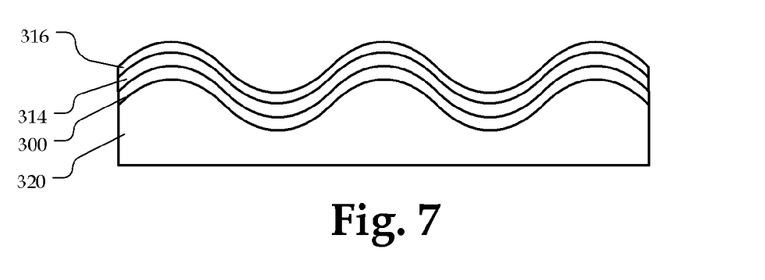

A second conductive layer 316 may then be formed on the dielectric composite 314, as illustrated at FIG. 7, resulting in a finished structure. The first conductive layer 300 and the second conductive layer 316 may be formed using, for example, the conductive material deposition chamber 108 of the system 100 of FIG. 1.

Figure 8:
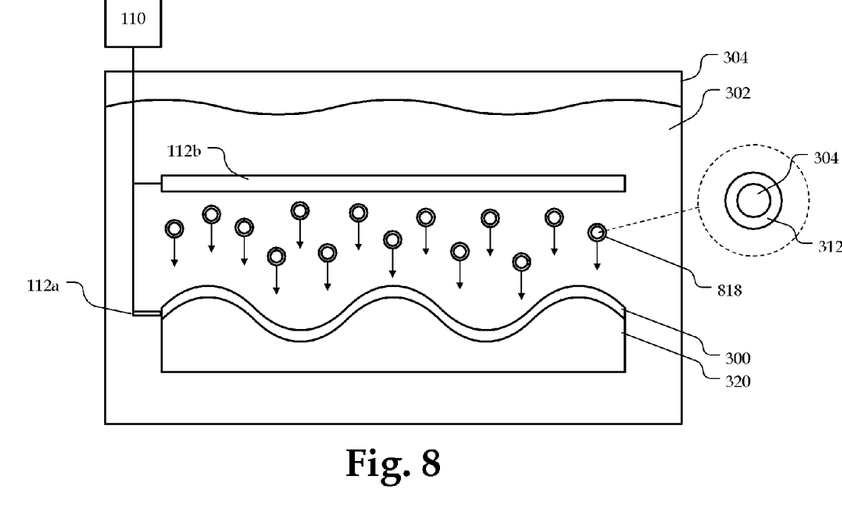
FIGS. 8-10 illustrate cross-sectional views of various stages of a device manufactured with another example method for making a dielectric composite apparatus.
Figure 9:
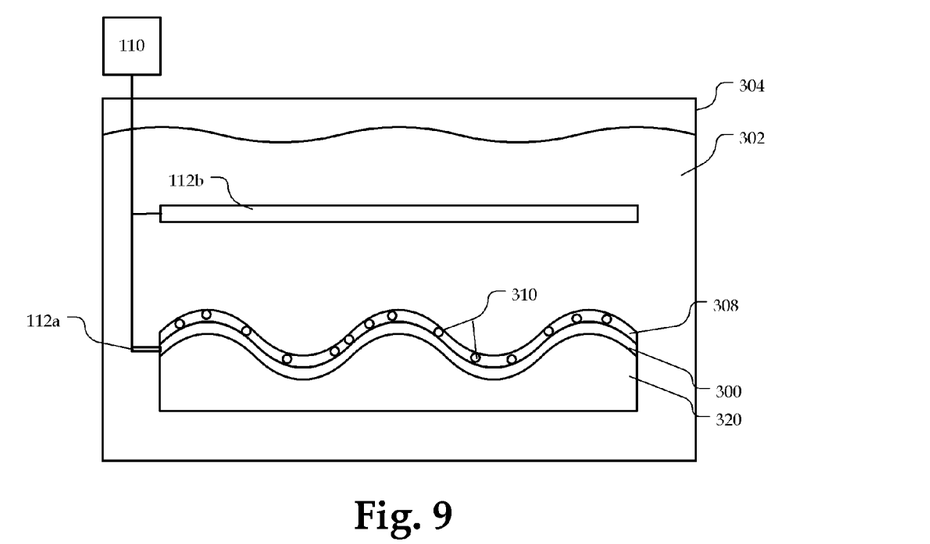
Figure 10:
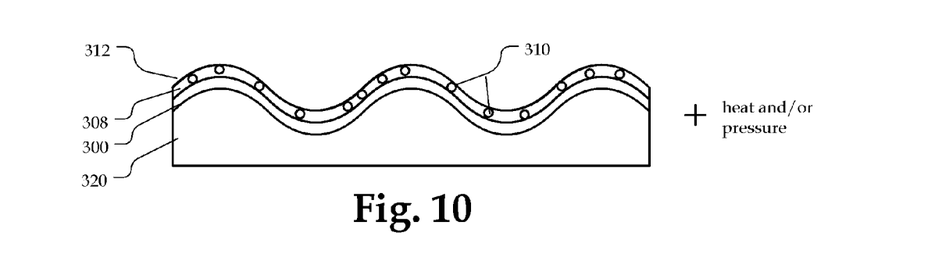

FIGS. 8-10 illustrate cross-sectional views of various stages of device manufactured with another example method for making a dielectric composite apparatus, arranged in accordance with at least some embodiments described herein. It should be noted that in various embodiments, one or more of the operations of FIGS. 3-7 and one or more of the operations of FIGS. 8-10 may be variously interchanged or combined with each other. For clarity, FIGS. 8-10 include the same reference numerals as those used in FIGS. 3-7 for those reference numerals designating the same or similar elements.

For the illustrated embodiment, rather than forming a layer of dielectric material and then applying the polymer on the layer of dielectric material, polymer-coated particles of dielectric material are deposited on the dielectric layer. As illustrated in FIG. 8, the first conductive layer 300 may be immersed into a bath 304 of a solvent 302, the solvent bath 304 being configured to facilitate conformal deposition of a layer of dielectric material onto the first conductive layer by electrophoretic deposition. Rather than comprising only dielectric material, particles 818 comprised of dielectric material 304 coated with polymer 312 are dispersed in the solvent 302.

A signal (e.g. voltage, current, electric field, magnetic field, etc.) can be applied to the electrode 112a, which is coupled to the first conductive layer 300, and also to the counter-electrode 112b, which may cause the particles 818 to be attracted to the conductive layer 300. As the signal continues to be applied, subsequent particles 818 may adhere to the particles 818 already adhered to the first conductive layer 300 as the repulsive forces between the particles 818 may be overcome by the strength of the electric field. As a result, the particles 818 may conformally form a layer 308 of polymer 312 and dielectric material 304, as illustrated in FIG. 9. Accordingly, although in various embodiments the first conductive layer 300 may have a non-planar surface, the layer 308 follows the contour of the first conductive layer 300.

Figure 6:
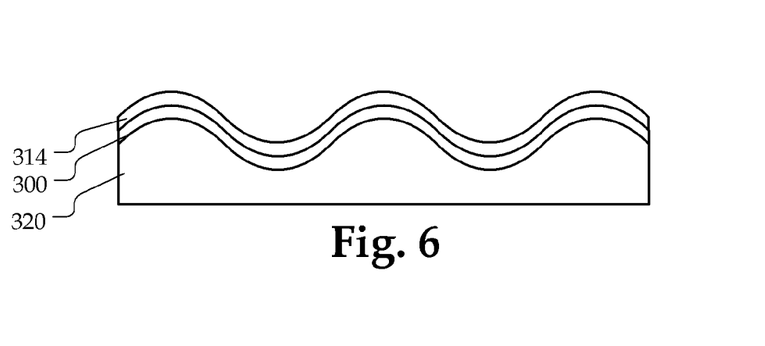

The layer 308 may include one or more spaces 310 (or pores) therein, and to fill the spaces 310, the first conductive layer 300 having the layer 308 of polymer 312 and dielectric material 304 deposited thereon may be removed from the bath 304, and heat or pressure, or both, may be applied to the first conductive layer 300 and the layer 308 as illustrated in FIG. 10, using, for example, the polymer deposition chamber 106 of the system 100 of FIG. 1. The heat and/or pressure may result in the polymer 312 being drawn into the spaces 310 in the layer 308 resulting in the structure including the dielectric composite 314, as illustrated in FIG. 6.

A second conductive layer 316 may then be formed on the dielectric composite 314, as illustrated at FIG. 7, resulting in a finished structure. The first conductive layer 300 and the second conductive layer 316 may be formed using, for example, the conductive material deposition chamber 108 of the system 100 of FIG. 1.

Figure 11:
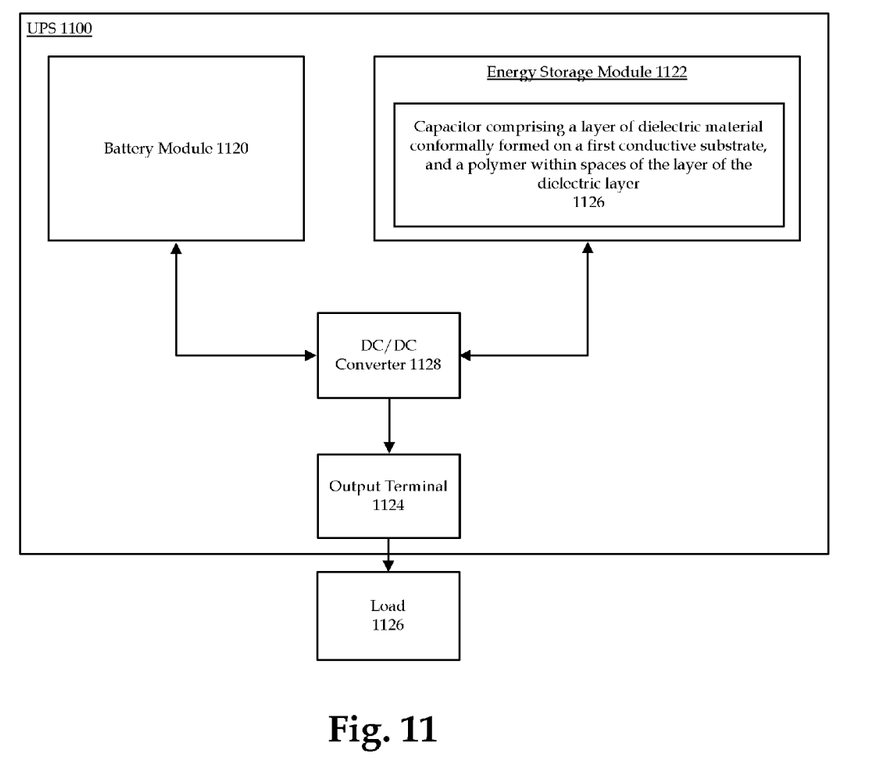
FIG. 11 is a block diagram of an example system including a dielectric composite.

Embodiments of dielectric composites described herein may be incorporated into various circuits, devices, apparatuses, and systems. FIG. 11 is a block diagram of an example system including a dielectric composite in accordance with at least some embodiments of the present disclosure. A basic configuration of the system 1100 may include a battery module 1120 and an energy storage module 1122 coupled to an output terminal 1124.

The energy storage module 1122 may include at least one capacitor 1126 having a dielectric composite as described elsewhere herein. The capacitor 1126 may include, for example, a layer of dielectric material conformally formed on a first conductive layer, and a polymer within spaces of the layer of dielectric material. In various embodiments, the capacitor 1126 may comprise a high-dielectric capacitor including a dielectric composite formed using a high-k dielectric material.

The system 1100 may further comprise a DC/DC converter 1128 coupled between the battery module 1120 and the output terminal 1124, and between the energy storage module 1122 and the output terminal 1124. The DC/DC converter 1128 may be configured to convert voltage from the battery module 1120 and/or the energy storage module 1124 from one voltage level to another, depending on the particular application.

In some examples, the battery module 1120 and/or the energy storage module 1122 may be coupled in parallel to the output terminal 1124. In some other examples, the one or more of the battery module 1120 and/or the energy storage module 1122 may be isolated from the output terminal 1124. The output terminal 1124 may in turn be coupled to a load 1126. In this arrangement, the energy storage module 1122 and/or the battery module 1120 may be configured to provide an uninterruptible power supply to the load 1126, in which the energy storage module 1122 may be arranged to provide a power supply in the event the battery module 1120 has a failure, and vice versa. The load 1126 may comprise any electrical apparatus such as, for example, a computer, a server system, an electronic circuit, or any other electrical system in which an uninterruptible power supply may be desirable.

Figure 12:
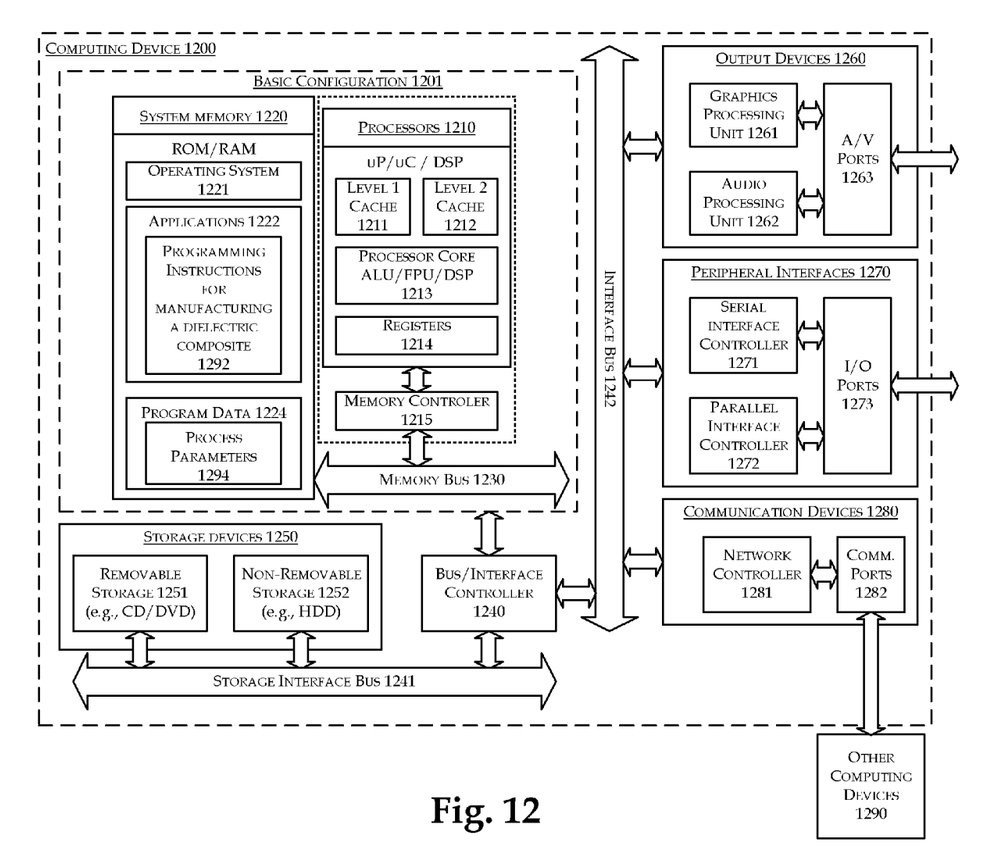
FIG. 12 is a block diagram illustrating an example computing device.

FIG. 12 is a block diagram illustrating an example computing device configured in accordance with at least some embodiments of the present disclosure. In a very basic configuration 1201, computing device 1200 typically includes one or more processors 1210 and system memory 1220. A memory bus 1230 may be used for communicating between the processor 1210 and the system memory 1220. In various embodiments, the computing device 1200 may be adapted to monitor, adjust, and/or control a process of manufacturing a dielectric composite apparatus described herein. The computing device 1200 may be implemented, for example, as the controller 102 of the system 100 of FIG. 1.

Depending on the desired configuration, processor 1210 may be of any type including but not limited to a microprocessor (μP), a microcontroller (μC), a digital signal processor (DSP), or any combination thereof. Processor 1210 may include one more levels of caching, such as a level one cache 1211 and a level two cache 1212, a processor core 1213, and registers 1214. An example processor core 1213 may include an arithmetic logic unit (ALU), a floating point unit (FPU), a digital signal processing core (DSP Core), or any combination thereof. An example memory controller 1215 may also be used with the processor 1210, or in some implementations the memory controller 1215 may be an internal part of the processor 1210.

Depending on the desired configuration, the system memory 1220 may be of any type including but not limited to volatile memory (such as RAM), non-volatile memory (such as ROM, flash memory, etc.) or any combination thereof. System memory 1220 may include an operating system 1221, one or more applications 1222, and program data 1224. Application 1222 may include programming instructions providing logic 1292 to implement the above described controlling, adjusting, and/or monitoring of a process of manufacturing a dielectric composite apparatus described herein. Program data 1224 may include the applicable process parameters 1294 and related values.

Computing device 1200 may have additional features or functionality, and additional interfaces to facilitate communications between the basic configuration 1201 and any required devices and interfaces. For example, a bus/interface controller 1240 may be used to facilitate communications between the basic configuration 1201 and one or more data storage devices 1250 via a storage interface bus 1241. The data storage devices 1250 may be removable storage devices 1251, non-removable storage devices 1252, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 1220, removable storage 1251 and non-removable storage 1252 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 1200. Any such computer storage media may be part of device 1200.

Computing device 1200 may also include an interface bus 1242 for facilitating communication from various interface devices (e.g., output interfaces, peripheral interfaces, and communication interfaces) to the basic configuration 1201 via the bus/interface controller 1240. Example output devices 1260 include a graphics processing unit 1261 and an audio processing unit 1262, which may be configured to communicate to various external devices such as a display or speakers via one or more NV ports 1263. Example peripheral interfaces 1270 include a serial interface controller 1271 or a parallel interface controller 1272, which may be configured to communicate with external devices such as input devices (e.g., keyboard, mouse, pen, voice input device, touch input device, etc.) or other peripheral devices (e.g., printer, scanner, etc.) via one or more I/O ports 1273. An example communication device 1280 includes a network controller 1281, which may be arranged to facilitate communications with one or more other computing devices 1290 over a network communication link via one or more communication ports 1282.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 1200 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 1200 may also be implemented as a personal computer including both laptop computer and non-laptop computer configurations.

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Various operations may be described as multiple discrete operations in turn, in a manner that may be helpful in understanding embodiments; however, the order of description should not be construed to imply that these operations are order-dependent. Also, embodiments may have fewer operations than described. A description of multiple discrete operations should not be construed to imply that all operations are necessary. Also, embodiments may have fewer operations than described. A description of multiple discrete operations should not be construed to imply that all operations are necessary.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An energy storage apparatus comprising:
   a first conductive layer having a non-planar surface, where the non-planar surface includes a wavy surface, a first surface area and a first contour;
   a layer of dielectric material conformally formed on the non-planar surface of the first conductive layer, wherein the layer of dielectric material includes a second surface area corresponding to the first surface area, the layer of dielectric material further includes a second contour that follows the first contour, and the layer of dielectric material includes the dielectric material with spaces between adjacent portions of the dielectric material,
   a polymer within the spaces of the layer of dielectric material; and
   a second conductive layer on the layer of dielectric material.

2. The apparatus of claim 1, wherein the first conductive layer is a metal material formed from one or more of aluminum, copper, platinum, gold, silver, or nickel.

3. The apparatus of claim 1, wherein the polymer comprises one or more of poly(ethylene terephthalate), polypropylene, or polycarbonate.

4. The apparatus of claim 3, wherein the dielectric material comprises one or more of hafnium silicate, zirconium silicate, hafnium dioxide, or zirconium dioxide.

5. The apparatus of claim 1, wherein the dielectric material has a dielectric constant between about 3.9 and about 20 and comprises barium titanate, wherein the barium titanate is coated with aluminum oxide.

6. An energy storage apparatus comprising:
   a first conductive layer having a non-planar surface, where the non-planar surface includes a wavy surface, a first surface area and a first contour, wherein the first conductive layer comprises a metal material formed from one or more of aluminum, copper, platinum, gold, silver, or nickel;
   a layer of dielectric material conformally formed on the non-planar surface of the first conductive layer, wherein the layer of dielectric material includes a second surface area corresponding to the first surface area, the layer of dielectric material further includes a second contour that follows the first contour, and the layer of dielectric material includes the dielectric material with spaces between adjacent portions of the dielectric material, wherein the dielectric material has a dielectric constant selected from dielectric constants that are greater than 3.9, but less than 20;
a polymer within the spaces of the layer of dielectric material, wherein the polymer comprises one or more of poly(ethylene terephthalate), polypropylene, or polycarbonate; and
a second conductive layer on the layer of dielectric material.

7. The apparatus of claim 6, wherein the dielectric material comprises one or more of hafnium silicate, zirconium silicate, hafnium dioxide, or zirconium dioxide.

8. The apparatus of claim 6, wherein the dielectric material comprises barium titanate, and wherein the barium titanate is coated with aluminum oxide.

9. An energy storage apparatus comprising:
a first conductive layer having a non-planar surface, where the non-planar surface includes a wavy surface, a first surface area and a first contour;
a layer of dielectric material conformally formed on the non-planar surface of the first conductive layer, wherein the layer of dielectric material includes a second surface area corresponding to the first surface area, the layer of dielectric material further includes a second contour that follows the first contour, and the layer of dielectric material includes the dielectric material with spaces between adjacent portions of the dielectric material, wherein the dielectric material has a dielectric constant selected from dielectric constants that are greater than 3.9, but less than 20 and comprises one or more of hafnium silicate, zirconium silicate, hafnium dioxide, or zirconium dioxide;
a polymer within the spaces of the layer of dielectric material; and
a second conductive layer on the layer of dielectric material.

10. The apparatus of claim 9, wherein the first conductive layer is a metal material formed from one or more of aluminum, copper, platinum, gold, silver, or nickel.

11. The apparatus of claim 9, wherein the polymer comprises one or more of poly(ethylene terephthalate), polypropylene, or polycarbonate.

12. The energy storage apparatus of claim 1, wherein the layer of dielectric material has a substantially uniform thickness.

13. The energy storage apparatus of claim 1, wherein:
the second conductive layer has a third surface area corresponding to the second surface area; and
the second conductive layer has a third contour that follows the first contour.

14. The energy storage apparatus of claim 6, wherein the layer of dielectric material has a substantially uniform thickness.

15. The energy storage apparatus of claim 6, wherein:
the second conductive layer has a third surface area corresponding to the second surface area; and
the second conductive layer has a third contour that follows the first contour.

16. The energy storage apparatus of claim 9, wherein the layer of dielectric material has a substantially uniform thickness.

17. The energy storage apparatus of claim 9, wherein:
the second conductive layer has a third surface area corresponding to the second surface area; and
the second conductive layer has a third contour that follows the first contour.

18. The energy storage apparatus of claim 1, wherein the layer of dielectric material is formed on the non-planar surface of the first conductive layer by electrophoresis.

19. The energy storage apparatus of claim 6, wherein the layer of dielectric material is formed on the non-planar surface of the first conductive layer by electrophoresis.

20. The energy storage apparatus of claim 9, wherein the layer of dielectric material is formed on the non-planar surface of the first conductive layer by electrophoresis.

* * * * *

UNITED STATES PATENT AND TRADEMARK OFFICE
CERTIFICATE OF CORRECTION

PATENT NO. : 8,441,775 B2  
APPLICATION NO. : 12/638224  
DATED : May 14, 2013  
INVENTOR(S) : Miller Page 1 of 1

It is certified that error appears in the above-identified patent and that said Letters Patent is hereby corrected as shown below:

On the Title Page, in item (54), and in the Specifications, in Column 1, Line 3, in Title, delete "ELETROPHORESIS" and insert -- ELECTROPHORESIS --, therefor.

In the Drawings

In Fig. 12, Sheet 8 of 8, delete "uP/uC / DSP" and insert -- µP/µC / DSP --, therefor.

In Fig. 12, Sheet 8 of 8, in Box "1215", in Line 1, delete "CONTROLER" and insert -- CONTROLLER --, therefor.

In the Specifications

In Column 3, Lines 54-55, delete "dielectric material 104" and insert -- dielectric material --, therefor.

In Column 6, Lines 34-35, delete "chamber 108" and insert -- chamber 106 --, therefor.

In Column 6, Lines 41-42, delete "chamber 108." and insert -- chamber 106. --, therefor.

In Column 8, Line 65, delete "module 1124" and insert -- module 1122 --, therefor.

In Column 9, Line 64, delete "(HDD)," and insert -- (HDDs), --, therefor.

In Column 9, Line 66, delete "(SSD)," and insert -- (SSDs), --, therefor.

In Column 10, Line 9, delete "(DVD)" and insert -- (DVDs) --, therefor.

In Column 10, Line 23, delete "NV" and insert -- A/V --, therefor.

Signed and Sealed this  
Twenty-seventh Day of August, 2013

Teresa Stanek Rea  
*Acting Director of the United States Patent and Trademark Office*